United States Patent [19]

Cohen et al.

[11] 4,161,718
[45] Jul. 17, 1979

[54] SUPERVISORY CONTROL SYSTEM

[75] Inventors: Yitzhak Cohen, Yahud; Yigal Brandman, Ramat Hasharon, both of Israel; Zvi Eckstien, Highland Park, Ill.

[73] Assignee: Motorola Israel Ltd., Tel-Aviv, Israel

[21] Appl. No.: 807,850

[22] Filed: Jun. 20, 1977

[51] Int. Cl.² ............................................. G06F 11/00
[52] U.S. Cl. ........................................ 340/146.1 BA
[58] Field of Search ................... 340/146.1, 146.1 BA, 340/146.1 AG

[56] References Cited

U.S. PATENT DOCUMENTS

| | | | |
|---|---|---|---|
| 3,245,040 | 4/1966 | Burdett et al. | 340/146.1 AG |
| 3,732,541 | 5/1973 | Neubauer | 340/146.1 BA |
| 3,772,649 | 11/1973 | Haselwood et al. | 340/146.1 BA |
| 3,876,980 | 4/1975 | Haemmig et al. | 340/146.1 BA |
| 3,986,167 | 10/1976 | Paul | 340/146.1 BA |
| 4,006,462 | 2/1977 | Padowski et al. | 340/146.1 BA |

Primary Examiner—Charles E. Atkinson
Attorney, Agent, or Firm—Rolland R. Hackbart; James W. Gillman

[57] ABSTRACT

An automatic supervisory control system is arranged to provide monitoring and supervisory functions in a noisy electrical environment over communication channels which are also noisy and generally highly congested.

The system includes a central control station linked to a plurality of status stations by a single dedicated or shared radio channel, a plurality of telephone wire lines, or a combination of both. A coded signal is used to communicate status signals and command signals between the central control station and the status stations. The central control station includes the status display elements, the memory elements, an audible alarm indicator, printed status and command reports, a keyboard for data entry and a computer for controlling system operation.

13 Claims, 11 Drawing Figures

SUPERVISORY CONTROL SYSTEM

BACKGROUND OF THE INVENTION

1. Field of the Invention

This invention relates to a supervisory control system, and more particularly, to a method and apparatus for an improved supervisory control system.

2. Description of the Prior Art

Supervisory control systems often must operate in an extremely noisy electrical environment. For example, such a system used to monitor and control status monitoring stations for a network of substations and transformers connected to a power plant of a power utility is highly susceptible to the high voltage and electrical noise environment. To cope with such an environment, typically prior art systems have been arranged to repetitively send a signal and detect and compare the repetitively sent signals and send a return signal when the comparison indicates reliable reception. But such a system is not found very reliable when a high level of noise is injected into the system from the power plant substations or transformer or other external sources. Generally the prior art systems are found incapable of providing reliable monitoring and supervisory functions in a noisy environment.

Also it is found that as the number of the monitoring stations increases and as channels allocated for transmission of monitoring, status, supervisory and similar signals get crowded, the prior art supervisory systems are found incapable of expanding their capacity. To increase capacity, the systems require additional communication channels. They are not capable of sharing existing radio channel or using existing voice communication channels. They do not allow easy and inexpensive expansion for additional stations that grow upwards to thousands of stations. Confronted with this situation, some prior art systems resort to manual operation where interrogation of the stations is more generally accomplished by operator assisted manual methods.

In short, none of the prior art systems provides a satisfactory automated supervisory control system that is highly reliable and that can operate in a noisy environment and that can handle large numbers of monitoring stations. For the foregoing and other shortcomings and problems, there has been a long felt need for an improved supervisory control system.

OBJECTS OF THE INVENTION

It is an object of the invention to provide an improved supervisory control system.

It is a further object of the invention to provide an improved supervisory control system that is highly reliable in the transmission and reception of status and command signals.

It is a still further object of the invention to provide an improved supervisory control system that includes a large number of stations and that can be easily expanded to accommodate additional stations.

It is a still further object of the invention to provide an improved supervisory control system that can operate reliably in noisy and hostile environments.

SUMMARY OF THE INVENTION

In accordance with the present invention, the aforementioned problems and shortcomings of the prior art are overcome and the aforementioned and other objects are attained by an inventive method and an inventive system.

According to the present invention, a novel method is provided for receiving successive signals that includes the steps of receiving a first and second signal, comparing the first and second received signals and providing an output signal when the first and second received signals are identical, applying the output signal to an output signal utilization means, and preventing the output signal utilization means from responding to any other output signals for a predetermined time interval.

According to another feature of the invention, a signal processing apparatus for coded signals includes input means, output means, and control means. The input means receives the coded signals, and the output means sends an output signal. The control means includes register means and decoding means for receiving a first coded signal from the input means, converting the received first coded signal into a first digital coded signal, checking the validity of the first digital coded signal, and storing a valid first digital coded signal in the register means. The decoding means further receives a second coded signal from the input means, converts the received second coded signal into a second digital coded signal, checks the validity of the second digital coded signal, compares a valid second digital coded signal with the valid first digital coded signal stored in the register means, and enables the output means to send out the output signal when the valid second digital coded signal is identical to the valid first digital coded signal stored in the register means.

Additional features, objects, and advantages of the supervisory control system in accordance with the present invention will be more clearly apprehended from the following detailed description together with the accompanying drawings.

BRIEF DESCRIPTION OF THE DRAWINGS

FIG. 2 illustrates the format of the coded signals which are utilized by the supervisory control system

FIG. 3 shows a general block diagram of the central control station.

FIG. 6 shows a block diagram of the control station.

I. GENERAL DESCRIPTION

A. System

Figure 1:
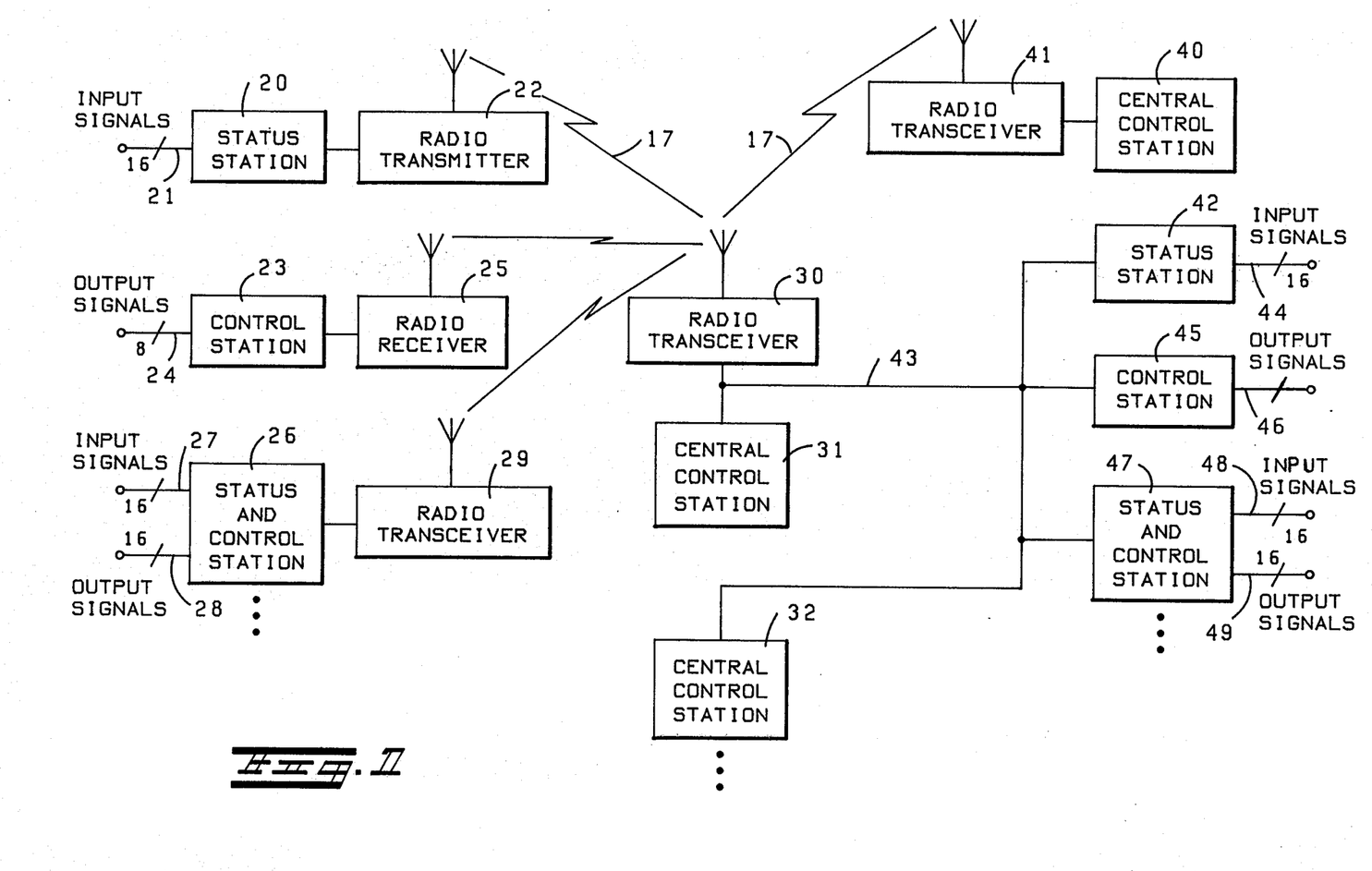
FIG. 1 illustrates a supervisory control system of the present invention.

Referring now to FIG. 1 of the drawings, it is intended that the stations of the supervisory control system can be located physically adjacent to one another or can be remotely located from one another and interconnected by a communication means. It is further intended that many more of each type of station can be added to the configuration of the system shown in FIG. 1. The communication links shown in FIG. 1 can be either radio communication links or telephone wire line communication links. Many other means for providing communication links and system configurations can be devised by those skilled in the art.

Central control station 31 is connected by telephone wire lines to radio transceiver 30, status station 42, control station 45, status and control station 47, and central control station 32. Radio transceiver 30 communicates by way of a single duplex radio channel 17 to radio transceiver 41, radio transmitter 22, radio receiver 25, and radio transceiver 29. The central control station 40 is connected to radio transceiver 41. The status station 20 is connected to radio transmitter 22. The control station 23 is connected to radio receiver 25. The status and control station 26 is connected to radio transceiver 29. The status stations 20 and 42 monitor up to 16 input signals 21 and 44 respectively. Control stations 23 and 45 can send out up to 8 output signals 24 and 46 respectively. Status and control stations 26 and 47 can each monitor 16 input signals 27 and 48 respectively and can control up to 16 output signals 28 and 49 respectively.

The supervisory control system of the preferred embodiment has the capacity for 2,048 stations. However, systems can be devised with many more or even less stations. Each of the 2,048 individual stations can have up to 16 output signals and 16 input signals. Each of the central control stations 31, 32, 40 can interact with 512 stations. Thus, four central control stations are required for a supervisory control system with 2,048 stations. For the purpose of increasing reliability, two redundant central control stations could be co-located and configured to control the same 512 stations.

In the supervisory system shown in FIG. 1, messages are communicated over a transmission channel, a radio channel or a plurality of wire lines, between the central control stations and the plurality of status, control, and status and control stations. Command signals are sent from the central control stations to control stations or status and control stations to enable particular stations to send selected output signals. Status signals, reflecting the change of state of input signals, are transmitted from status stations or status and control stations to the central control stations where the changed status signals are displayed as alarm conditions. The operator manning the central control station then acts on the alarm conditions as called for by the changed status signals.

B. Signalling Format and Scheme

The signalling scheme used in the present invention is essentially digital in nature. The status or command signals are rendered in digital word form. Each digital word includes, for convenience, a given number of digital bits, for example, 32 bits. The signals in the digital word forms are encoded into the well known frequency shift keying (FSK) format for transmission purposes. To assure transmission and reception in noisy environment, the signals are sent repetitively. For example, a command or a status signal, in the form of 32 digital bits, is sent in successive frames. Each frame may have a given number, for example, 20 digital words transmitted in series, thereby providing message redundancy. The number of frames repeated for transmission is selected to assure correct transmission and reception. In the present system the frames are repeated up to 8 times. Preferably the number of frames of the digital word signals repeated is selected to assure time diversity, that is, given a particular interval of any noisy transmission that may have taken three frame intervals, by repeating 8 times, the receiver is enabled to disregard the noisy frames essentially, and receive the remaining frames properly in receiving the transmitted signal.

Figure 2A:
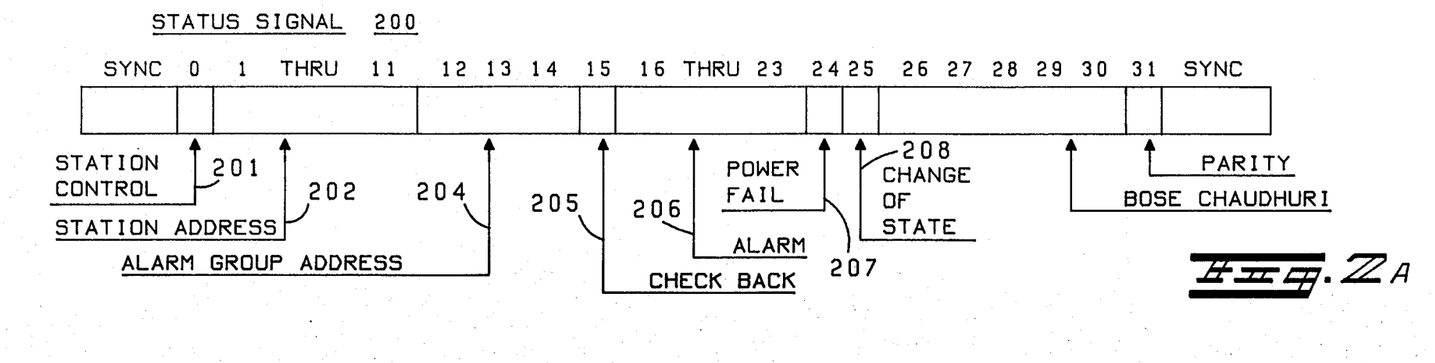
FIG. 2a shows in detail the organization of the status signal transmitted by the respective stations to central control station.
Figure 2B:
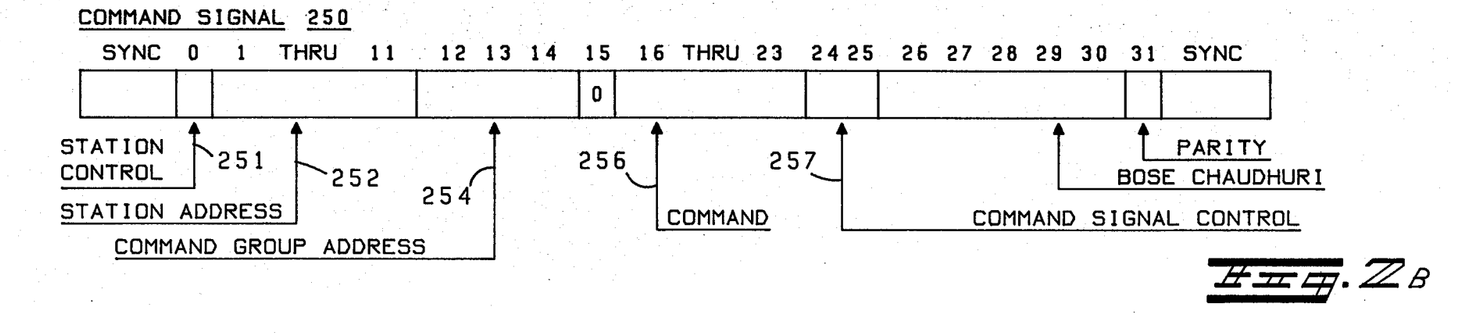
FIG. 2b shows in detail the organization of the command signal transmitted by the central station to the stations.

FIGS. 2a and 2b show detailed illustrations of the digital bit organization of the 32 bit digital word for the status and command signal, respectively.

Referring to FIG. 2a, the status signal 200 in the form of a 32 bit digital word is composed of 26 information bits (bit 0 through bit 25) and 6 security bits (bit 26 through bit 21). The information bits are made up of station control (bit 0), station address (bit 1 through 11), alarm group address (bit 12 through 14), check-back bit (bit 15), alarm bits (bit 16 through 20), primary power fail bit (bit 24) and a change-of-state bit (bit 25). The station control bit 201 (bit 0) is always coded as a logic 1. The station address 202 (bits 1 through 11) is a binary address which identifies each individual station. Bits 10 and 11 identify one of four central control stations. The alarm group address 204 (bits 12 through 14) is used to select up to 8 alarm groups of which only two are presently used in the preferred embodiment. The check-back bit 205 (bit 15) is used for system control, as will be explained shortly. Each of the alarm bits 206 (bits 16 through 23) is associated with one of eight binary status signals. The primary power fail 207 is indicated by bit 24. The change-of-state (COS) mode 208 is indicated by bit 25.

The security signal includes bits 26 through 31 and is composed of a 5 bit Bose Chaudhuri (BCH) cyclic code and a parity bit for detecting errors in the status signal 200.

The status signal 200 in the form of 32 bit digital word is transmitted from the status stations 20 and the status and control stations 26 to the central control stations 31 to report the status of the monitored input signals 21 and 27 respectively (see FIG. 1).

Referring to FIG. 2b, the command signal 250 is likewise composed of 26 information bits and 6 security bits. The information bits are made up of the station control bit (bit 0), the station address (bits 1–12), the command group address (bits 12–14), an unused bit (bit 15), the command bits (bits 16–23) and the command signal control bits (bits 24 and 25). The station control bit 251 (bit 0), if encoded as a logic 1, directs the command signal to a particular station, and, if encoded as a logic 0, directs the command signal 250 to a group of stations. The station address 252 (bits 1 through 11) can select any one station or a group of stations in response to the station control bit 251. The command group address 254 (bits 12 through 14) can select any one of 8 command groups, although only 2 command groups are used in the preferred embodiment. The unused bit 15 is a logic 0, and is presently not allocated to a particular function in the preferred embodiment. Each of the command bits 256 (bits 16 through 23) encodes a binary command for each one of the 8 command signals. The command signal control word 257 (bits 24 and 25) selects one of 4 operational modes in the stations. The station operational modes are the execute mode, interrogate mode, select mode and acknowledge mode, as will be explained later.

The status signals and command signals are encoded according to frequency-shift keying (FSK) modulation, which shifts between 900 hertz and 1500 hertz tone signals for each bit of the coded signal and codes logic 1 bits with a pulse width twice as long as logic 0 bits.

Figure 2C:
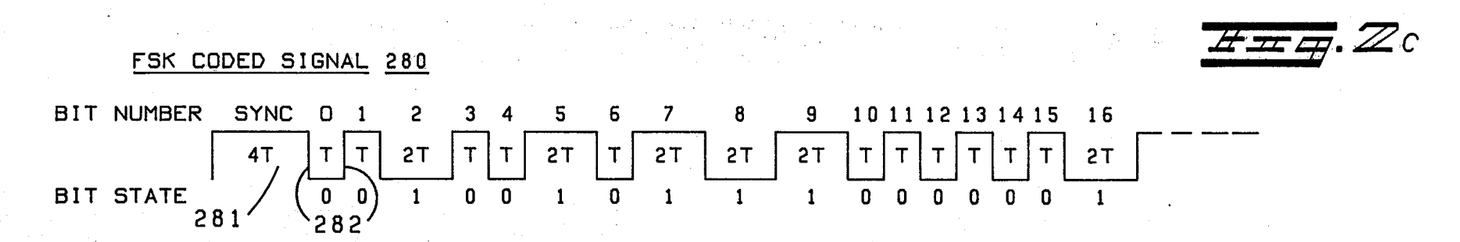
FIG. 2c shows the detailed timing for a frequency shift keying modulated coded signal with a randomly selected sequence of bit states.

FIG. 2c shows a 16 bit segment of the 32 bit digital word in the form of a frequency-shift keying (FSK) modulated signal 280. The FSK modulated signal includes a synchronization signal and a digital word as illustrated. The synchronization signal 281 is coded with a pulse width four times as long as that of a logic 0, the logic 0 pulse width being represented by a time period "T". The digital word is made up of transitions between 900 and 1500 hertz in T or 2T time intervals as illustrated. The transitions 282 between tones, 900 hertz and 1500 hertz, are illustrated by the changes in state of the waveform. The FSK modulated signals can be transmitted over a radio channel or over a telephone wire line that has sufficient bandwidth to pass the 900 hertz and 1500 hertz tones.

The transmission of the coded signals between the stations utilizes both the message redundancy and the time diversity principle to insure that the coded signals are received in the noisy environment. To obtain message redundancy, each coded signal is transmitted up to 20 times in a two second interval or can optionally be transmitted eight times in a one-half second interval. The message redundancy increases the probability of reception under conditions of severe noise. The reception of just one of the coded signals is sufficient to get the message through.

Time diversity is achieved by repeating the two second messages (or one-half second messages) up to eight times at intervals of approximately one minute. If the first transmission of messages is lost due to radio frequency interferance or noise interferance on a telephone line, then subsequent messages have a high probability of being received. The number of repetitions of the bursts of messages can be adjusted to suit the particular system. In addition, a channel monitor can be used to ascertain if there is any activity on the radio channel or on the telephone wire line before transmitting a particular burst of messages. The channel monitor would insure that two stations are not attempting to transmit messages at the same time.

A received coded signal is subjected to a number of tests to determine that the coded signal is valid. The FSK modulated coded signal is checked for proper bit width of the binary signals and the synchronization signal. The coded signal is checked to insure that a synchronization signal precedes and follows the coded signal and also that the coded signal is composed of exactly 32 bits. The security portion of the coded signal includes checking the Bose Chaudhuri (BCH) cyclic code and the parity code. Together, the Bose Chaudhuri and parity checks reject all one bit errors, all two bit errors, all three bit errors, approximately 96% of all four bit errors, all odd numbered errors and all bursts of errors up to 31 bits in length. The level of security provided insures very reliable system operation under high noise conditions.

The reliability of the signalling scheme is further enhanced by use of a check-forward or check-back mode of operation or both, where necessary. Briefly stated, according to the check-forward mode of operation, a command signal received at the remote stations are compared to an applied command signal, which is the stored command signal that is momentarily applied to the output means, and if the received command signal is identical to the applied command signal, the output means is permanently enabled. By way of the check-forward method, the circuitry at the remote station is checked at the output means, not just at the receiving means.

According to the check-back mode of operation, a received command signal is transmitted from a remote station back to central control station where the central control station verifies that the command signal is identical to the signal it had originally sent. Then, the central control station transmits the command signal again for subsequent execution. The remote station receives the second transmission of the command signal and enables the output means accordingly. The signalling scheme further provides that the remote station can perform a check-forward operation on the first and second transmissions of a check-back command signal. The check-back mode of operation which requires three transmissions, two from the central control station and one from the remote station, provides additional reliabilitly at the cost of creating congestion on the communication channel.

II. DETAILED DESCRIPTION

A. Central Control Station

A central control station is used to provide all necessary control functions for the system. The central control station includes a computer, a plurality of peripheral equipments such as keyboard for operator-machine interface, teleprinter, FSK transceiver facility, and the like. The station also includes a plurality of display units, and display drivers for driving the display unit under the command of the computer.

The present illustrative central control station is designed to handle up to 512 stations. The central control station computer has a stored program for providing system flexibility to accommodate a wide variety of requirements and options. The stored program of the central control station has an executive program and a plurality of subprograms for providing the features and operational capabilities described hereinafter. The various programs can be written by one skilled in the art based on the following description of the central control station features and operation. The central control station man-machine interface allows an operator to interact with the stations in the system for various diverse functions as will be explained in detail hereinafter.

Referring to further details, as illustrated in FIG. 3, the central control station 300 includes a computer 301, keyboard and pushbutton switches 302, teleprinter 303, an FSK transmitter and receiver 307, a radio or wire line unit 308, display driver units 304 to 306 and display units 320 to 324. The computer 301 can be any of a number of commercially available minicomputers or microcomputers, such as the Motorola M6800 system. The computer 301 samples the status of the keyboard and pushbutton switches 302. The keyboard can be of any suitable type. For example, it can be of the type that has a 3×5 array of pushbuttons including the digits 0 through 9 and alphabetical characters A and B. The keyboard is similar to a telephone keyset. The pushbutton switches include an entry clear key, message send key, printer control keys, time set key, operation mode select keys, an audio alarm reset key, and display control keys. The functioning of the keyboard and pushbutton switches will be discussed shortly.

The computer 301 is of the type that can be operated to provide an output to an 80 column serial ASC II external printer 303. The teleprinter 303 is driven by the computer 301 and automatically prints out all status signals received from the stations, an indication of the status signals which have changed, all operator initiated command signals to the stations, summaries of the status of the stations at predetermined time intervals and any other types of information. Received status signals, which indicate a change-of-state (COS) of one or more of the status signals, are referred to as alarm messages and cause an audible alarm to be activated. The audible alarm is turned off by depressing the audio reset pushbutton.

By operator entered directives, the stored program of the central control station can provide the following printouts:
 status summary of all stations or a set of stations;
 status of a selected station; and
 COS status for all stations or a set of stations. The printer control keys, print disable, alarm print, and summary print, together with the keyboard are used by the operator to select the foregoing printouts.

The computer 301 transmits command signals and receives status signals through the FSK transmitter and receiver 307. The FSK transmitter and receiver 307 performs the FSK conversion for transmitted and received signals and is connected to a radio or wire line unit 308 which provides a transmission channel to the stations in the supervisory control system. The stored program in the computer 301 performs all the validity checks on the received status signals and generates the pulse duration timing and security codes for the transmitted command signals.

The computer 301 communicates display data to and receives display unit status from the display driver units 304, 305 and 306. The computer 301 communicates to the display driver units 304 to 306 by means of an eight bit data bus 340, and update clock signal 341, an update start signal 342 and a flash switch signal 343. The display driver unit 304 communicates with the display units 320 to 323 by means of 24 display driver signals 352, 8 display driver signals 351, and flash reset switches 353 to 356. The display driver unit 304 stores the data received from the computer 301 to enable the light emitting diode (LED) displays in the display units 320 to 323. The display units 320 to 323 each contain up to 48 LED display indicators. Each of the display units can provide a visual indication of the status of any of the stations in the system. In the preferred embodiment, the computer 301 can communicate with up to 16 display driver units each controlling 4 display units, for a total of 64 display units. Three of the display units are combined to provide a control display, which includes a 6 digit 7-segment display for display of the time, keyboard entries and program control modes; command indicators; a time set indicator; a set indicator; a printer indicator; a set call indicator; an audio disable indicator; and a display overflow indicator.

The central control station incorporates a shared display concept which provides fewer display units than there are stations in the supervisory control system. A portion of the display units is organized together as a rolling display. The display units in the rolling display physically are located side by side to facilitate observation by an attendant. Alarm messages are entered into the leftmost display unit of the rolling display and the changed status signals are flashed in the display. The flashing of the received alarm message can be reset by depressing the reset pushbutton for that display unit. If an alarm message is received from a station and the rolling display is completely filled, the status signal for that station is stored in the overflow memory in the computer for subsequent display, and the display overflow indicator is flashed.

By depressing the roll key, the status signal in the leftmost display unit is deleted, the status signals in the display units to the right of the vacated display unit will each be shifted to the left, and the highest priority message in the overflow memory will be displayed on the rightmost display unit in the rolling display. Flashing status signals that have been rolled out of the rolling display are stored back into the overflow memory. The overflow memory can store all of the alarm messages which exist in the system. A specific station can be rolled off the rolling display by entering the octal coded station address from the keyboard before depressing the roll key. By repeatedly depressing the roll key, all of the alarm messages with a flashing indication in the overflow memory can be reviewed in the rolling display.

To fix a display unit in the rolling display to a particular station, a station address is entered from the keyboard and the call fixed key is depressed. The status signals for the specified station will be displayed in the leftmost display unit. If there are one or more previously allocated fixed display units, the newly entered fixed display unit will be the display unit immediately to their right. Any number of display units can be fixed, providing that at least one display unit remains available for alarm messages. A fixed display unit is indicated by illumination of the decimal point in the rightmost digit of the station number display.

The stored status signals of any station can be entered into an available display unit by entering the station address from the keyboard and depressing the recall key.

Several different operation modes of the central control station can be entered by using the operation mode select keys and the keyboard. A parameter mode of operation is used to select the frequency of automatic interrogations of stations and to enter the stations which will be automatically interrogated. The parameter mode is entered into and exited from by consecutively depressing five numerical keys and a sixth key for the particular operation desired. The sequence of numerical keys entered is displayed in the control display.

An interrogate mode provides for manual interrogation of a selected station or group of stations. To interrogate a station, the interrogate key is depressed followed by entry of the station address from the keyboard. If it is desired to interrogate a set of stations, the set select key is depressed before entering the station address. The control display will indicate an error for incorrect entries, and if so indicated, depressing the clear key will cancel the entry. The interrogate command is then transmitted by depressing the send key. The send key is depressed a second time if it is desired to send the interrogate command while the communication channel is busy. Additional transmissions of the interrogate command can be provided by depressing the send key for each desired transmission.

In order to send an acknowledge command, the acknowledge key is depressed and the station address is entered from the keyboard. The set select key can be depressed before entering the station address to send the acknowledge command to a group of stations. If the acknowledge command has been entered correctly, the send key is depressed to transmit the command. To transmit the acknowledge command when the channel is busy, the send key is depressed a second time. Additional transmissions of the acknowledge command can be provided by depressing the send key for each desired transmission.

The central control station also provides a control mode of operation. Entry and exit from the control mode is achieved by sequentially depressing six numerical keys. The exact sequence of keys depressed can be uniquely specified for a particular supervisory control system to provide security from unauthorized entry of control commands. In order to send a control signal, the control key is depressed and the station address is entered from the keyboard. The set select key is depressed to transmit the control command to a group of stations. Next, the A or B key is depressed to select the desired control group. Then, the numbers of the control signals to be activated are entered from the keyboard. The entire entry can then be reviewed in the control display. If an error has been indicated, the clear key can be depressed and the control command can be reentered. To transmit the command signal, the send key is depressed. The send key can be depressed a second time to transmit the command signal while the transmission channel is busy. Additional transmissions can be provided by depressing the send key for each desired transmission.

The time in hours and minutes is displayed in the control display unless data for a command signal has been entered or the parameter mode has been entered. When the time is displayed, the decimal point between the hours and minutes is flashing. In order to update the time, the time set key is depressed. Next, the year, month, day, hour and minutes are sequentially entered from the keyboard, and finally the time set key is depressed again. The new time setting is entered, displayed and printed out on the external printer.

B. Display Driver Unit and Display Unit

The display driver units and associated display units, under control of the computer, provide a visual indication of the system status, including the status of the central control station in the control display and the status of the other stations in the system in the display units. Each display unit provides status for an individual station, including the station address, the status of 8 input signals, and particular operational status of the station. If a station reports an alarm condition, the displayed status is flashed in the display unit until the flash reset pushbutton is depressed. In the illustrative system, the computer controls up to 16 display driver units which, in turn, drive the control display and up to 61 display units.

The display driver unit contains the logic and memory required to drive the associated light emitting diodes (LEDs) in the corresponding display units so as to achieve the display of the status signals requested by the computer and to transmit the status of the flash reset switches from the display units to the computer in the central control station. The display driver unit has three functional sections: a display control section which accesses the display data from the memory and drives the LEDs accordingly; controls up to 16 display driver units which, in turn, drive the control display and up to 61 display units.

The display driver unit contains the logic and memory required to drive the associated light emitting diodes (LEDs) in the corresponding display units so as to achieve the display of the status signals requested by the computer and to transmit the status of the flash reset switches from the display units to the computer in the central control station. The display driver unit has three functional sections: a display control section which accesses the display data from the memory and drives the LEDs accordingly; the memory update section which updates the memory in accordance with the data received from the computer on the data bus; and the flash switch selector which multiplexes the four flash reset switches from the display unit onto the flash switch signal to the computer.

Figure 4:
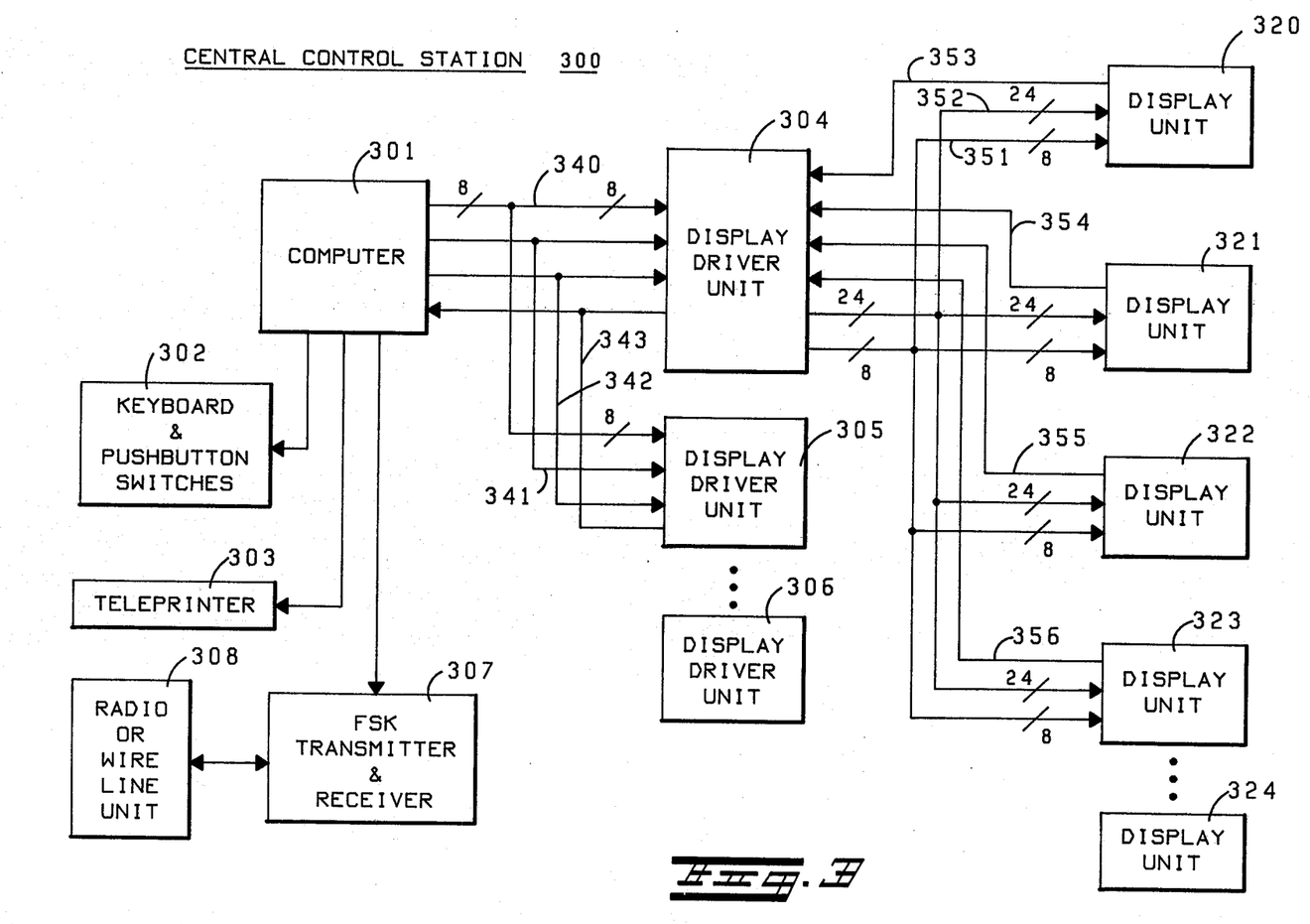
FIG. 4 shows a detailed block diagram of the display driver unit and the display unit which are sub-units of the central control station.

Referring to FIG. 4, the display driver unit 400 is shown with one of the four display units 450. The display unit 450 contains a status display 451 which includes 48 LEDs to be illuminated. A four digit 7 segment display, which contains 28 of the LEDs, is used to display the station address. The decimal point LED in the rightmost digit is illuminated to differentiate fixed display units from rolling display units. The remaining 19 LEDs indicate the power fail condition, the test condition, the station fail condition, and the on/off condition of a group of 8 input signals for that station, a green LED being illuminated for a normal condition (off) and a red LED being illuminated for an alarm condition (on). The flash reset switch 452 is depressed to acknowledge reception of the signal change indicating an alarm condition.

C. Status and Control Station

The status and control stations are used for monitoring the status and controlling the operation of external devices. The monitored status, sensed from input signals, is coded into status signals and sent to the central control station. Command signals are received from the central control station and enable the status and control station to send output signals to the external devices. In the present illustrative system, the status and control station can monitor up to 16 input signals from and send up to 16 output signals to the associated external devices. The status and control station has several different modes of operation which provide additional message signal security, including the checkforward mode and the check-back mode, as will be explained shortly. The status and control station is well suited for applications that require the status and control of unattended remote stations in a supervisory control system.

The status and control station includes a radio or wire line unit, a power supply, an encoder/decoder, an input unit, and an output unit. The input unit monitors a plurality of input signals and provides an output signal to the encoder/decoder unit if one or more input signals has changed state. The encoder/decoder unit loads a status signal, including monitored input signals together with validity codes, into registers, encodes the status signal according to FSK modulation and sends the status signal by means of the radio or wire line unit to the central control station. Coded command signals from the central control station are received by the radio or wire line unit and converted from FSK modulated signals into digital words by the encoder/decoder unit. The command word is loaded into registers in the output unit, and the output unit sends out the output signals in accordance with the command word.

Figure 5A:
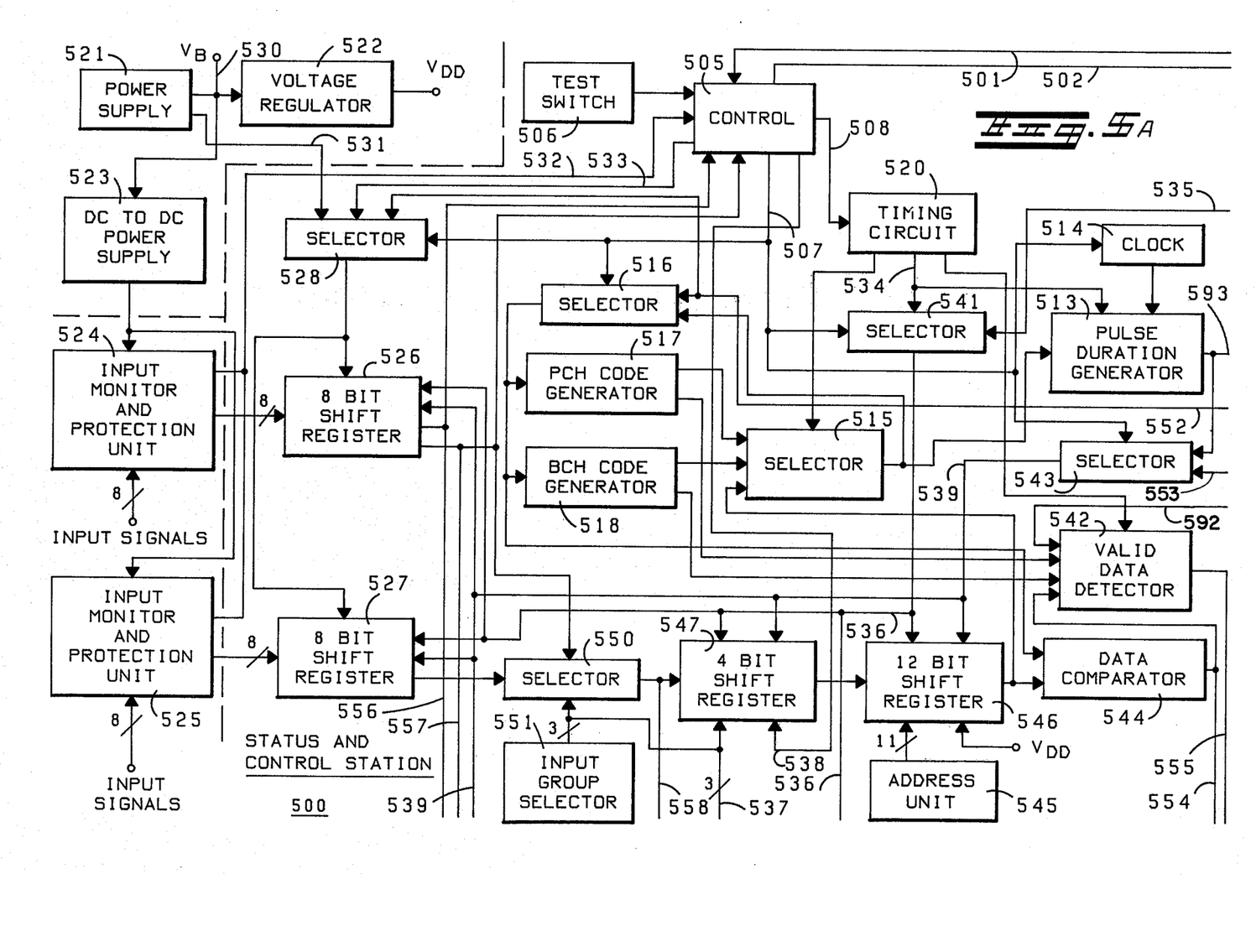
FIGS. 5A, 5B, and 5C show a block diagram of the status and control station.
Figure 5B:
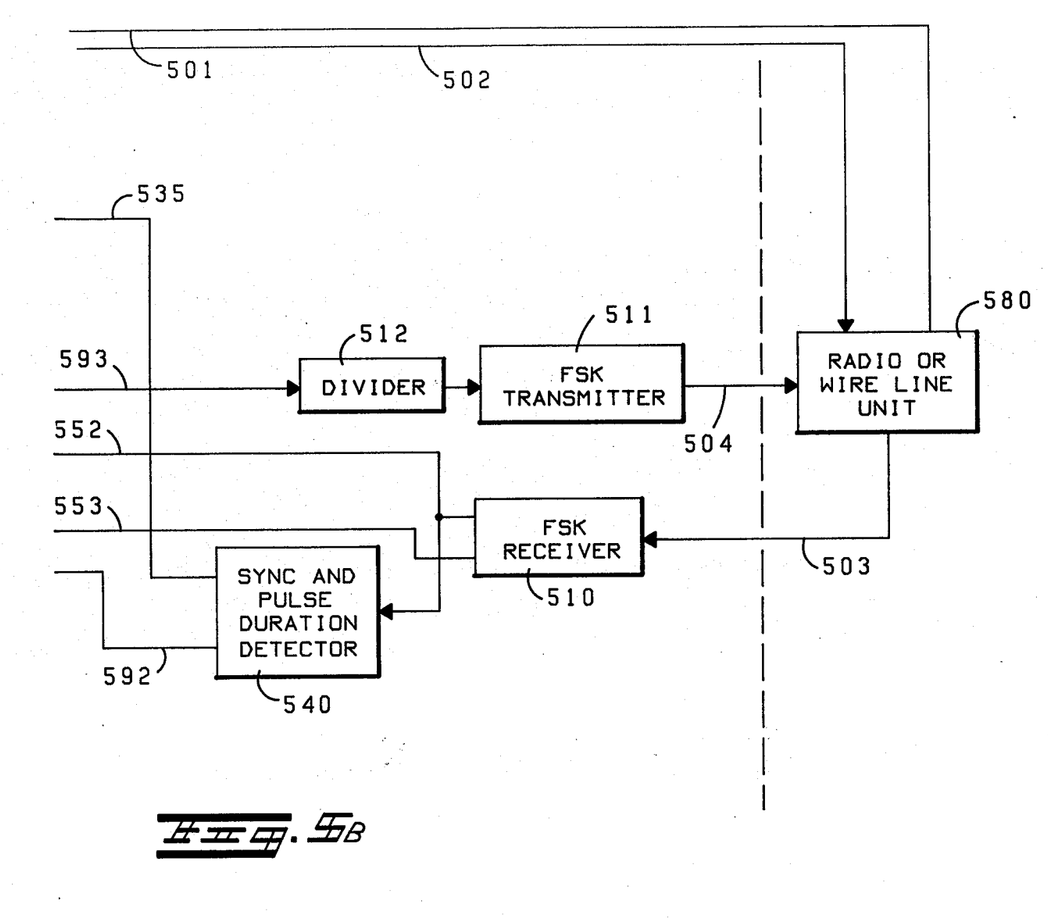
Figure 5C:
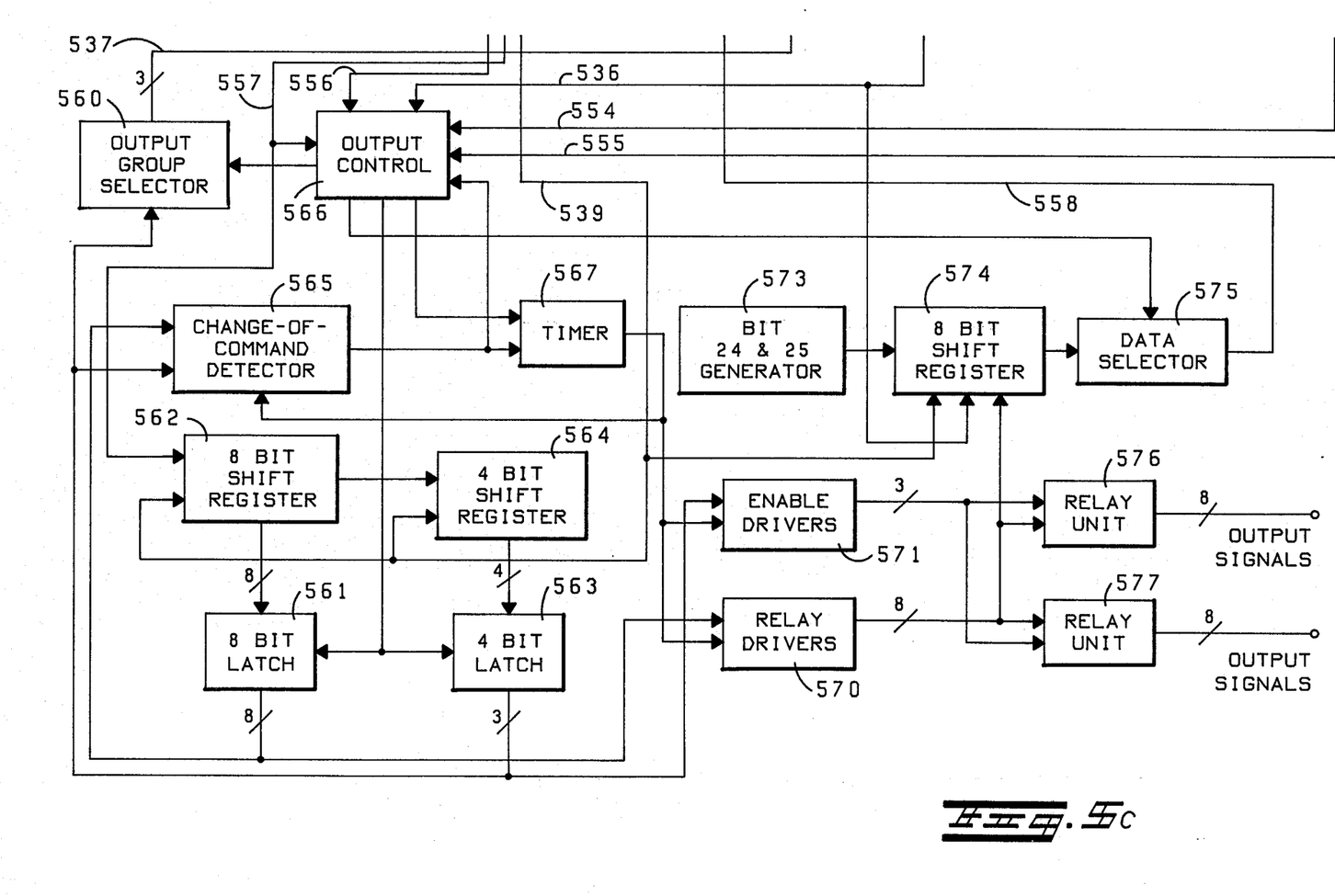

The detailed operation of the status and control station can be understood by referring to FIGS. 5A, 5B and 5C taken in combination. The status and control station 500 interfaces with a radio or wire line unit 580 in order to communicate both status and command signals to and from the central control station. The radio or wire line unit 580 provides a channel monitor signal 501 wich indicates when the radio or wire line is in use. The channel monitor signal 501 is applied to the control 505. The radio or wire line unit 580 receives a push-to-talk signal 502 from the control 505 which enables the radio or wireline unit to transmit FSK signals 504. The radio or wire line unit 580 also receives FSK signals 503 which are applied to the FSK receiver 510.

The control 505 provides the necessary control signals and timing for the various modes of operation of the status and control station 500. The control 505 provides an encode/decode signal 507 which provides for encode operation to transmit a status signal and decode operation to receive a command signal. An output enable signal 508 is provided from the control 505 to enable the timing circuit 520. The test switch 506 is applied to the control 505 to cause the transmission of a status signal in response to activation of the test switch 506.

The power supply 521 provides the supply voltage 530 to the voltage regulator 522 and the DC to DC power supply 523. The voltage regulator 522 provides the VDD supply to all the logic circuits of the status and control station 500. The DC to DC power supply 523 provides an isolated voltage necessary for the input monitor and protection units 524 and 525. The power supply 521 provides a power fail indication signal 531 which is applied to the selector 528.

The encode mode of operation of the status and control station 500 will be described next. The input monitor and protection units 524 and 525 each monitor eight input signals by means of a sensing circuit which is described in a related Canadian application, Ser. No. 274,059, filed on March 16, 1977, invented by Yitzhak Cohen et al and entitled, "Sensing Circuit." Upon sensing a change of state of one or more of the input signals, the input monitor and protection units 524 and 525 provide an input change-of-state signal 532 to the control 505. In response, the control 505 provides the encode state on the encode/decode signal 507. The control 505 also provides a logic 1 on the output change-of-state (COS) signal 533 which is applied to selector 528. For the test mode, the output change-of-state signal 533 is a logic 0.

The timing circuit 520 being enabled by the output enable signal 508 provides a frame synchronization signal 534 to enable the pulse duration generator 513 and by way of selector 541 to load the various data registers. The selector 541 gates the frame synchronization signal 534 to the load signal 536 in response to the encode state on the encode/decode signal 507. In response to the load signal 536 the 12 bit shift register 546 is parallel loaded with a logic 1 in the first bit position from VDD and an 11 bit station address from the address unit 545. The 4 bit shift register 547 is parallel loaded with a 3 bit group code 537 from the input group selector 551 and a check-back bit 538 which is a logic 0 from the control 505. The 8 bit shift register 526 is parallel loaded with the 8 signals from the input monitor and protection unit 524, and the 8 bit shift register 527 is parallel loaded with the 8 signals from the input monitor and protection unit 525. The power fail indication signal 531 followed by the output COS signal 533 are consecutively applied to the serial input of 8 bit shift registers 526 and 527 by the selector 528 in response to an output signal from the timing circuit 520. The selector 550 routes the serial data output from the 8 bit shift register 526 to the serial input of the 4 bit shift register 547 for the first transmitted status signal and the serial data output of the 8 bit shift register 527 to the serial data input of the 4 bit shift register 547 for the second transmitted input signal. This process is repeated so that the data from each of the 8 bit shift registers 526 and 527 is transmitted alternately. The appropriate group code 537 is provided by the input group selector 551 for each of the 8 bit shift registers 526 and 527.

The pulse duration generator 513 receives the clock signal from the clock generator 514 which is enabled by the encode state of the encode/decode signal 507. The clock signal output of the pulse duration generator 513 is routed to selector 543, and gated by the selector 543 to the clock signal 539 in response to the encode state on the encode/decode signal 507. The clock signal 539 serially clocks the bits from the shift registers 546, 547, 526 and 527 to the selector 515. The timing circuit 520 enables the selector 515 to gate the first 26 status bits from the 12 bit shift register 546 to the pulse duration generator 513. The next 5 bits are gated by the selector 515 from the BCH code generator 518 to the pulse duration generator 513. Next, the parity bit is gated by the selector 515 from the parity code generator 517 to the pulse duration generator 513. The selector 516 gates the output of the selector 515 to the parity code generator 517 and to the BCH code generator 518 in response to the encode state of the encode/decode signal 507. The output of the pulse duration generator 513 is a clock pulse train in which the interval between pulses is determined by the logic 0 or logic 1 state of the data. If the data bit is a logic 1, the interval will be twice as long as the interval for a logic 0. The synchronization signal which precedes and follows a data word is four times as long as a logic 0 bit. The output of the pulse duration generator 513 is applied to the divider 512 which divides the pulse train output by two and applies the resultant signal to the FSK transmitter 511. The FSK transmitter 511 provides an FSK signal 504 composed of two alternating tones, 900 hertz and 1500 hertz, in response to the output signal from the divider 512. The FSK signal 504 is applied to the radio or wire line unit 580 and transmitted to the central control station.

Next, the timing circuit 520 provides another frame synchronization signal to initiate the transmitting of the next status signal. The timing circuit 520 sends up to 20 repetitive transmissions of the status signals which alternately provide the status of the two groups of eight input signals. By optional programming, the timing circuit 520 can select a variety of repetitive transmission sequences.

In the decode mode the status and control station 500 receives command signals from the central control station by means of the radio or wire line unit 580. The radio or wire line unit 580 routes the received command signals to the FSK receiver 510 which converts the FSK coded signal into a digital received data signal 552. The FSK receiver 510 incorporates the principles and concepts of related Canadian application, Ser. No. 274,140, filed on Mar. 16, 1977, invented by Ygal Brandman et al and entitled, "A Tracking Oscillator and Use of the Same in a Frequency to Voltage Converter." The FSK receiver 510 also provides a data shift signal 553 which is gated by selector 543 to the clock signal 539 in response to the decode state on the encode/decode signal 507. The received data signal 552 is applied to the synchronization and pulse duration detector 540 which checks for the presence of the synchronization signal and for proper timing of the logic 0 and logic 1 states of the received data signal 552. The detection of a synchronization signal by the synchronization and pulse duration detector 540 provides a reset signal 535 to the selector 541, which gates the reset signal 535 to the load signal 536 in response to the decode state on the encode/decode signal 507. The load signal 536 causes the station address to be loaded from the address unit 545 into the 12 bit shift register 546. If the synchronization and pulse duration detector 540 senses the absence of a synchronization signal or invalid pulse duration timing, a signal is provided to the valid data detector 542 to indicate invalid data.

The received data signal 552 is gated by the selector 516 to the parity code generator 517, the BCH code generator 518 and the data comparator 544 in response to the decode state on the encode/decode signal 507. The data comparator 544 compares the address portion of the received data signal to the address data from the 12 bit shift register and produces an output signal 554 if the addresses are not identical. The BCH code generator 518 generates a BCH code for the received data signal and compares the generated BCH code to the received BCH code and provides an output to the valid data detector 542 if the codes are not identical. The parity code generator 517 generates a parity signal for the received data signal and compares the generated parity signal to the parity signal of the received data signal and provides an output to the valid data detector 542 if the parity signals do not agree. The valid data detector 542 receives the output signals indicating invalid data from the parity code generator 517, the BCH code generator 518 and the data comparator 544 and an enable signal from the timing circuit 520, and provides a valid data signal 555 if the received data signal is valid.

The selector 528 gates the received data signal 552 to the 8 bit shift register 526 in response to the decode state on the encode/decode signal 507. The received data signal 552 is serially shifted through the 8 bit shift register 526 to the RB24 signal 557. When all 32 bits of the command signal have been received, the 8 bit shift register 526 will contain the command signal control bits, RB25(556) and RB24(557). The command signal control bits are used to provide the execute mode, the interrogate mode, the select mode, and the acknowledge mode. The bits RB25(556) and RB24(557) are applied to the control 505 for decoding and appropriate response.

The received data signal is further serially shifted from RB24(557) into the 8 bit shift register 562 and the 4 bit shift register 564 in response to the data shift signal 553. When all 32 bits of the command signal have been received, the 8 bit shift register 562 contains the command word and the 4 bit shift register 564 contains a command group code. In response to a valid data signal 555 and the execute mode as coded by RB25(556) and RB24(557), the output control 566 provides a load signal to the 8 bit latch 561 and the 4 bit latch 563 which receive the data from the 8 bit register 562 and 4 bit register 564, respectively, and then enables the timer 567.

The timer 567 provides an output signal to activate the relay drivers 570 and the enable buffers 571. The relay drivers gate the data from the 8 bit latch 561 to the relay units 576 and 577. The enable buffers 571 gate the data from the 4 bit latch 563 to the relay units 576 and 577. The relay units 576 and 577 are enabled by the enable signals from the enable buffers 571 to provide the output signals in accordance with the data signals from the relay drivers 570. The received command signal is specifically directed to activate only one of the relay units 576 or 577 as determined by the coding of the enable signals from the enable buffers 571. A subsequent command signal must be transmitted to enable the other of the relay units 576 or 577. The relay units 576 and 577 can provide either momentary or magnetically latched output signals.

The change-of-command detector 565 receives the data from the 8 bit latch 561 and the 4 bit latch 563 and continuously monitors the latches for a change in the state of the data stored therein. If a change in the state of the data in these latches occurs during the output signal from the timer 567, the change-of-command detector 565 provides an output signal to reset the timer 567 and the output control 566 to prevent the changed data from being applied to the relay units 576 and 577. Any disturbance or noise which changes the state of the data in the 8 bit latch or the 4 bit latch during the output signal from the timer will be prevented from being applied to the output signals by the change-of-command detector 565. This procedure insures that the system controlled by the output signals does not affect the applied output signals due to a change of any command storage elements in the status and control station during the time period (approximately one second) while the output signals are being applied.

The status and control station 500 can be configured to provide a check-forward mode of operation. In this mode of operation, the receipt of two valid command signals which are identical is required before the timer 567 is enabled by the output control 566. The first valid received signal is stored in the 8 bit register 526, the 8 bit register 562 and the 4 bit register 564. The output control 566 loads the 8 bit latch 561 and the 4 bit latch 563 from the 8 register 562 and the 4 bit register 564, but does not enable the timer 567.

The next valid received signal is compared by the data comparator 544 to the stored signal of which the command portion is the output signals of the relay drivers 570 which have been momentarily activated and stored, as described hereinafter. First, the relay drivers 570 are momentarily activated by the output control 566 in response to the load signal 536, which in turn momentarily activates the enabled relay unit 576 or 577. Due to the slow response time of the relays, the momentary activation is not long enough to change the state of the relay output signals. The output signals of the momentarily activated relay drivers 570, which connect to the relay coils of the relay units 576 and 577, are parallel loaded into the 8 bit register 574 in response to the load signal 536. The data from the 8 bit shift register 574 is gated by the data selector 575 to the input/output data signal 558 in response to the output control 566 and is ready for serial transfer together with generated bits 24 and 25 (573) for the check-forward configuration to the 4 bit shift register 547. The command group code from the 4 bit latch 563 is gated by the output group selector 560 to the group code signals 537 by the output control 566. The command group code is loaded into the 4 bit shift register 547 along with a logic 0 from the checkback signal 538 in response to the load signal 536. The station address from the address unit 545 and VDD are loaded into the 12 bit shift register 546 from the address unit 545 in response to the load signal 536. The data comparator 544 then serially compares the contents of the 12 bit shift register 546, the 4 bit shift register 547, the 8 bit register 574 and the generated bits 24 and 25 (573) to the next received data signal. If the compared data words are identical, the data comparator 544 provides a compare signal 554 to the output control 566, which then activates the timer 567 to enable the selected relay unit 576 or 577.

If the received data signal is valid but is not identical to the stored signal, the received data signal, having been serially shifted into the 8 bit register 562 and 4 bit register 564 in response to the clock signal 539, is then loaded by the output control 566 into the 8 bit latch 561 and 4 bit latch 563 from the 8 bit register 562 and 4 bit register 564, respectively. Subsequent comparisons are performed with the new valid received data signal stored in the latches and succeeding received data signals in a similar manner to that described by the foregoing. The check-forward mode of operation not only provides additional command signal security, but also performs a check on the control circuitry of the status and control station 500.

The acknowledge mode of operation is detected by the control 505 upon receipt of a command signal which provides the acknowledge code on signals RB25(556) and RB24(557). In response to the receipt of an acknowledge command signal, the control 505 terminates the sending of successive status signals by preventing further output enable signals 508 to the timing circuit 520 which controls signal transmission. The control 505 will send up to eight groups of twenty status signals to the central control station, unless an acknowledge command signal is received between transmission of groups of status signals. The use of the acknowledge command signal eliminates unnecessary congestion on the communication channel.

The interrogate mode of operation is directed by the control 505 upon receipt of a command signal which provides the interrogate code on signals RB25(556) and RB24(557). The interrogate mode initiates transmission of the status signals as previously described. Normally, the status signals are transmitted by the control 505 in response to the input change-of-state signal 532. Depressing the test switch 506 will also enable the control 505 to transmit the input signals. For the test mode and the interrogate mode, the output COS bit 533 of the status signal will be a logic 0. The control 505 transmits up to eight groups of twenty status signals in response to the test switch 506 or the interrogation command signal.

The select mode of operation is initiated by receipt of a select command signal which provides the select command code on RB25(556) and RB24(557). In the select mode, the control 505 provides an output enable signal 508 to the timing circuit 520 for transmission of a single group of up to 20 status signal. The command data from the select command signal, which was loaded into the 8 bit latch 561 and 4 bit latch 563, is now routed back to the shift registers 547 and 546 as described for the check-forward procedure. The 4 bit shift register 547 is loaded with the output group code from the 4 bit latch 563 and a logic 1 from the checkback signal 538, and the 12 bit shift register 546 is loaded with the station address from the address unit 545 and a logic 1 from VDD. The data in these registers is then transmitted to the central control station as described for the encode mode of operation.

The central control station then verifies the checkback signal and issues an execute command signal if the check-back signal is identical to the select command signal. In the status and control station 500, the execute command signal is either received and applied or compared with the stored select command signal as described in the checkforward mode of operation. If the compared signals are identical, the timer 567 enables the relay unit 576 or 577 in accordance with the command data.

D. Control Station

The control station, illustrated in FIG. 6, is used for controlling the operation of external devices. Command signals are received from the central control station and enable the control station to send output signals to the external devices. In the present illustrative system, the control station sends up to 8 output signals to the associated external devices. The control station is similar to the basic control portion of the status and control station and can be adapted to provide similar modes of operation.

The control station includes a radio or wire line unit, a decoder, an output unit, and a power supply. Generally, coded command signals are received by the radio or wire line unit from the central control station and converted from FSK modulated signals into digital words and loaded into a register by the decoder unit. The output unit sends out the output signals in accordance with the command word in the register. The radio or wire line unit need only have a receiver, since transmitting is not required.

E. Status Station

Figure 7:
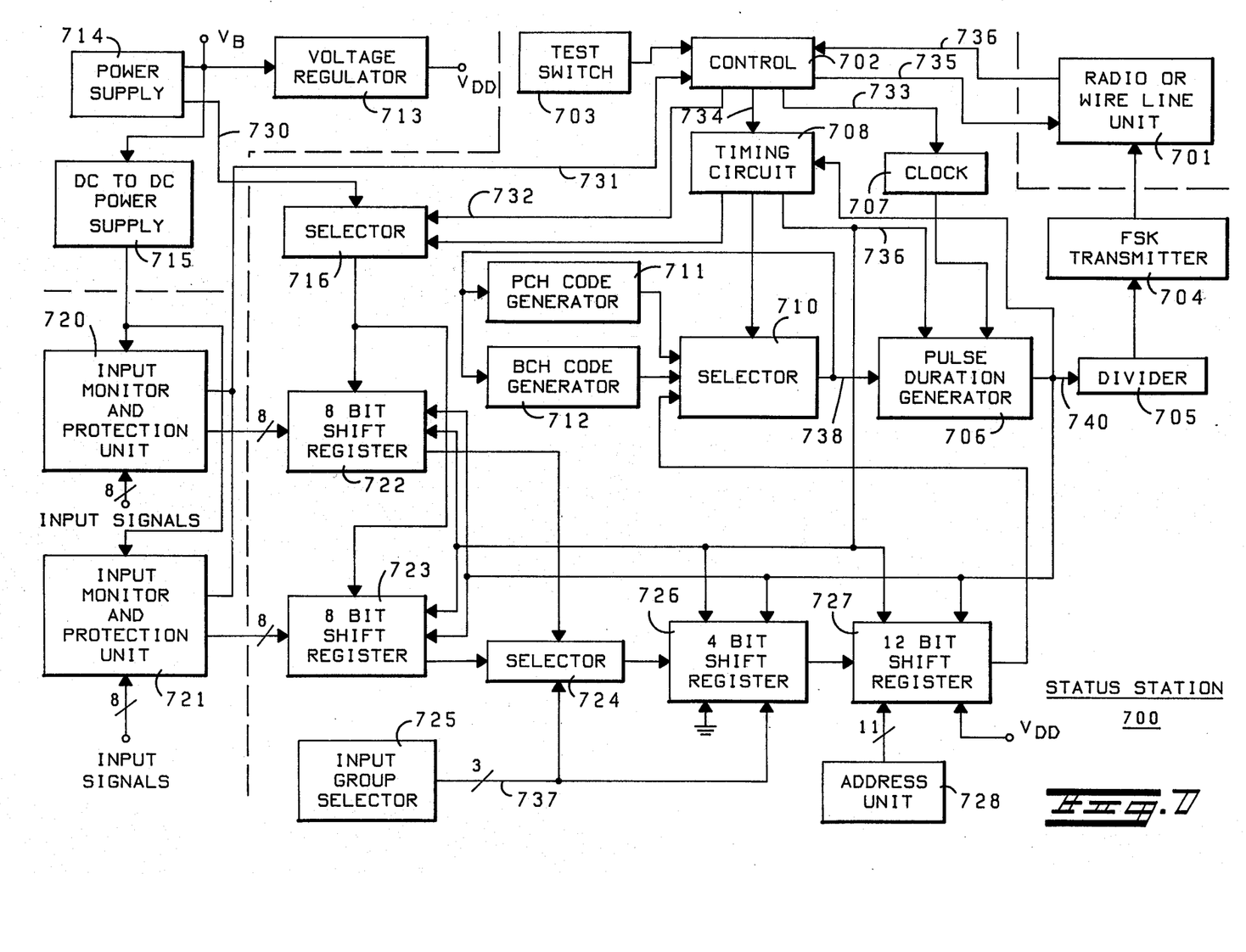
FIG. 7 shows a block diagram of the status station.
Figure 8:
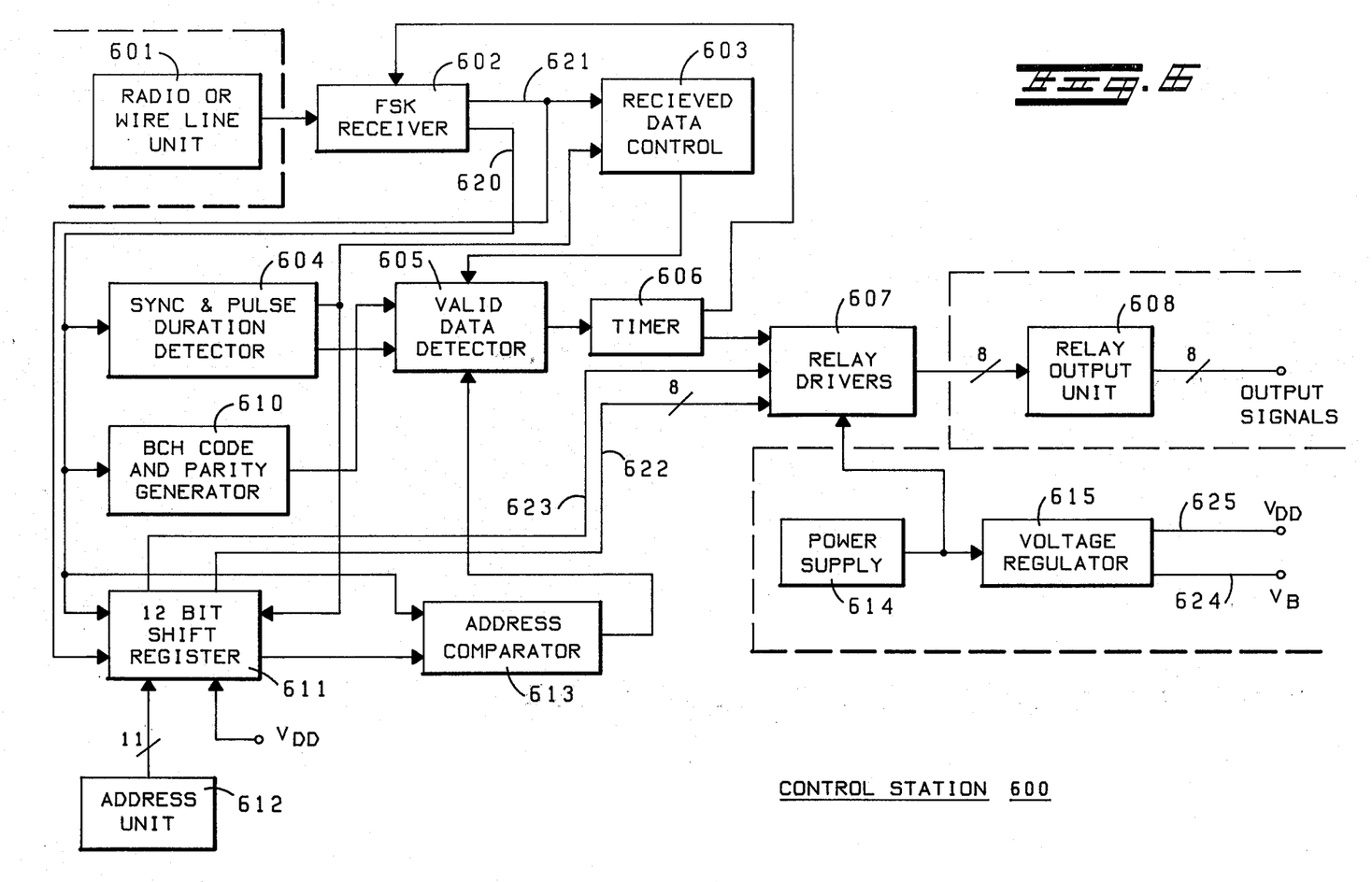

The status station, illustrated in FIG. 7, is used to continuously monitor the operation of remote devices and transmit the monitored status, encoded into status signals, to the central control station by means of a radio or wire line unit. The coded status signals are received and automatically displayed by the central control station. Those status signals which have changed state are indicated as alarms in the display. In the present illustrative system, the status station continuously monitors up to 16 input signals from the associated external devices. The status station is similar to the basic status monitoring portion of the status and control station and can be adapted to provide similar modes of operation.

The status station includes a radio or wire line unit, a decoder unit, an input unit and a power supply. Generally, the status of the input signals from the associated external devices are monitored by the input unit, which provides an output signal to the encoder unit if any monitored input signal changes state. The encoder unit loads the input signals into a register, converts the input data word together with a generated validity code into an FSK modulated status signal, and transmits the coded status signal to the central control station by means of the radio or wire line unit. Since the status station only transmits signals, the radio or wire line unit does not require a receiver. However, a receiver in the radio or wire line unit can be used to monitor the communication channel for activity, so that the status station can be operated to transmit status signals only when the communication channel is not busy.

Hereinabove, various features of the invention have been described in detail in conjunction with a supervisory control system. Certain of these features are broader in scope so that they are not limited to a supervisory control system for potential application, and that they can be more broadly applied to other types of systems. Two important features of the supervisory control system are the check-forward system and the change-of-command sensing system described in detail hereinabove. A feature of the present invention of general applicability is the check-forward method for processing coded signals as described in detail hereinabove with reference to FIGS. 5a, 5b and 5c in combination. Restated briefly with reference to FIGS. 5a, 5b and 5c in combination, in the check-forward mode, the status and control unit 500 compares a valid second command signal to the stored command signal (latches 561 and 563) which is momentarily applied to the output means (relay units 576 and 577) and if the command signal is identical to the applied stored command signal, the output means is permanently enabled. By sensing the stored command signal at the output means, the circuitry at the status and control station 500 is checked for proper operation at the output driving means (relay drivers 570). Thus, the check-forward of operation not only provides additional command signal reliability, but also performs a comprehensive check on the operation of the control circuitry. The check-forward method provides a means of checking remote circuitry without the use of a check-back method or a large number of signal transmissions. Many signal processing systems could advantageously utilize such a check-forward method.

Another feature of the present invention of broader applicability is the change-of-command sensing described hereinabove in detail with reference to FIG. 5c. Restated generally, the change-of-command sensing entails the following. An incoming signal from a central control station is received by the status and control station into the registers of the output unit (FIG. 5c) and is sent out to the relay units 576 and 577 via the latches, relay drivers and the enable buffers as illustrated. The output unit is so designed that the selected relay unit is enabled a given duration of time, for example, one second, whereby the output signals from the relay unit are utilized to activate an external device. Inasmuch as the circuitry is designed to operate in a highly noisy environment, for that one second duration, the relay unit providing the output signal is rendered immune or impervious to internal changes taking place in the registers, that is, the changes caused by noise signals. More specifically referring to FIG. 5c this is attained as follows. In the status and control unit 500, the command signal is applied to the output means by the timer 567 while the internal latches 561 and 563 are monitored by the change-of-command detector 565 for any change of state during activation of the timer 567. If a change of state is detected, the timer 567 is reset and the command signal is cancelled. In controlling systems in a noisy electrical environment, activation of the external system can result in a significant amount of noise which can easily change the state of storage elements. The monitoring of internal storage elements for a predetermined time interval while the output means is being activated and maintained is a method which has wide application in electrical systems which are susceptible to a noisy electrical environment. A subsequent command signal can be effectively applied to the output means when the noise in the environment has subsided.

While hereinabove, an invention for a supervisory control system and various subfeatures which have broader scope of applicability beyond the supervisory control system have been described, various other modifications and changes may be made by those skilled in the art without departing from the spirit and scope of the present invention.

What is claimed is:

1. A method for receiving successive signals comprising the steps of:
   receiving a first signal;
   receiving a second signal;
   providing a first output signal for the first received signal;
   momentarily applying the first output signal to an output signal utilization means;
   sensing the status of the output signal utilization means during the application of the first output signal;
   comparing the sensed status of the output signal utilization means with the second received signal and providing a second output signal when the sensed status and second received signal are identical;
   applying the second output signal to the output signal utilization means.

2. The method according to claim 1, further including the step of preventing the output signal utilization means from responding to any other output signals for a predetermined time interval.

3. The method according to claim 2, wherein said preventing step includes the steps of monitoring the status of the output signal utilization means; providing a third output signal when the monitored status changes during the predetermined time interval; and cancelling the application of the second output signal to the output signal utilization means in response to the third output signal.

4. The method according to claim 2, wherein said applying step includes the step of storing the second output signal; and said preventing step includes the steps of monitoring the stored second output signal, providing a fourth output signal when the monitored stored second output signal changes during the predetermined time interval, and cancelling the application of the second output signal to the output signal utilization means in response to the fourth output signal.

5. The method according to claim 2 wherein the preventing step includes the step of preventing any further signals from being received during the predetermined time interval.

6. The method according to claim 2 wherein the preventing step includes the step of cancelling the application of the second output signal to the output signal utilization means if any other signals including noise signals are detected during the predetermined time interval.

7. Signal processing apparatus for digital signals comprising:
   input means for receiving digital signals;
   output means for sending an output signal when enabled;
   output signal utilization means for receiving the output signal from the output means;
   means for momentarily enabling the output means in accordance with a first received signal;
   means for sensing the status of the output signal utilization means while the output means is enabled;
   register means;
   means for storing the sensed status of the output signal utilization means in the register means; and
   means for comparing a second received digital signal to the stored status in the register means and fixedly enabling the output means when the second received digital signal and the stored status are substantially identical.

8. The signal processing apparatus according to claim 7, further including means for preventing said fixedly enabled output means from responding to further received signals for a predetermined time interval.

9. The signal processing apparatus according to claim 7, wherein said output signal utilization means includes at least one relay that has an energizing coil responsive to the output signal from the output means, said sensing means sensing the status of the energizing coil.

10. The signal processing apparatus according to claim 8, further including means for detecting a change in the output signal from the output means during the predetermined time interval and disabling the output means in response to a detected change in the output signal.

11. The signal processing apparatus according to claim 7, wherein each digital signal includes an information signal and a security signal for detection of at least one error in the corresponding information signal, said input means including means for validating each received digital signal in accordance with the security signal thereof and rejecting invalidated received digital signals.

12. The signal processing apparatus according to claim 11, wherein the security signal of each digital signal is coded according to a predetermined Bose Chandhuri cyclic code.

13. The signal processing apparatus according to claim 7, wherein said comparing means includes means for enabling the opertion of said signal processing apparatus to be repeated with the second received digital signal and a third received digital signal when the second received digital signal and the stored status are not substantially identical.

* * * * *